Converse & Burdge,
Making Wooden Screws.
N°6,387.    Patented Apr. 24, 1849.
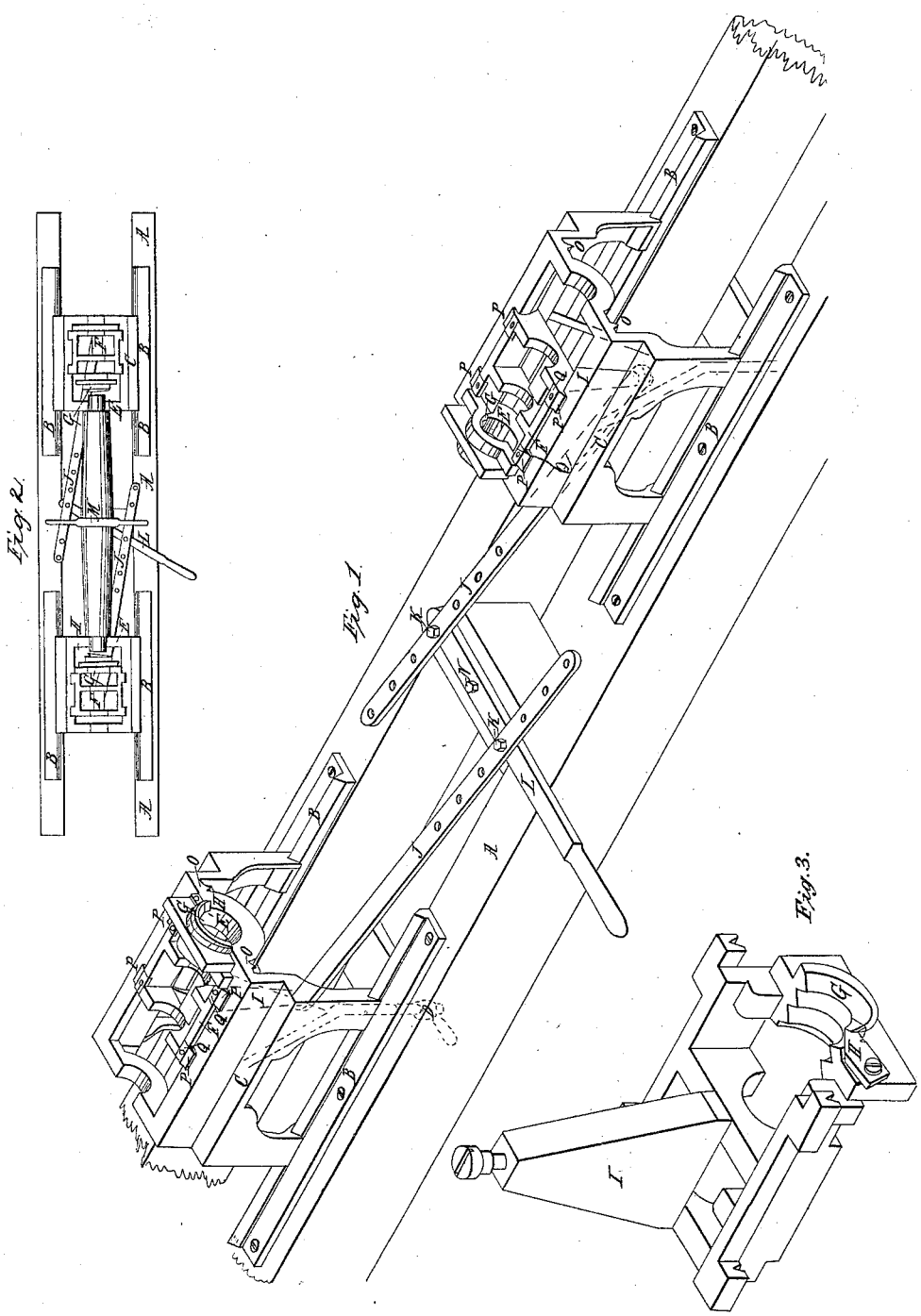

UNITED STATES PATENT OFFICE.

W. F. CONVERSE AND J. BURDGE, OF CINCINNATI, OHIO.

MACHINERY FOR CUTTING SCREWS ON RAILS FOR BEDSTEADS.

Specification of Letters Patent No. 6,387, dated April 24, 1849.

*To all whom it may concern:*

Be it known that we, WILLIAM F. CONVERSE and JONATHAN BURDGE, both of Cincinnati, in the county of Hamilton and State of Ohio, have invented a new and useful Machine for Cutting Screws on Bedrails.

The object of this machine is two fold—namely, firstly, to make exactly corresponding screws on the opposite ends of the rail simultaneously; secondly, to provide for the economization of time, and we do hereby declare that the following is a full, clear and exact description of the construction and operation of the same reference being had to the annexed drawings making a part of this specification in which Figure 1 is a perspective view. Fig. 2 is a top view of the machine ready for operation. Fig. 3 is a section showing the carriage and semicircular female screw with the V cutter attached.

A is a bed or bench of wood.

B B are guides attached to the bench. On these guides rest head stocks C C which are made fast in any usual way such as by screw bolts D D. These head stocks have semicircular rests E E adapted to fit exactly the tenent of the rail. These rests entirely dispense with the necessity of centering the rails, it being sufficient just to drop the rail into the rests.

F F, are carriages made to slide on the headstocks C C.

O O are V's on which they slide, the carriages being held up to the V's by means of jaws P P P P. These jaws are made fast by screws Q Q Q Q by which they can be tightened up as the parts wear—thus this apparatus is entirely free from the objection of wearing loose, to which feed screws in other machines are liable. These carriages are provided one with right hand and the other with left hand semicircular female screws or followers G G corresponding to the screws to be cut on the rail; in front of these semicircular screws or followers are attached V cutters H H also at the same angle as the screw to be cut. Projecting from these carriages are arms I I to which are pivoted rods J J connected by bolts K K with a lever L pivoted to the bench by bolt N precisely midway between the bolts K K thus forming what may be termed a perfect adjuster and graduator. This system of lever and rods connecting the two carriages and forming the "adjuster and graduator" is to insure concerted and precisely corresponding action in the cutters, being entirely free from the wear and consequent backlash attendant upon all other machines—thereby cutting a screw upon both ends of the rail, each a fac simile of the other. The bolts K K and N and the holes in the rods are made taper in order that they may be screwed down as fast as they become loose. The V cutters are so arranged as to be easily removed and sharpened, being simply screwed to the carriage.

The simplicity of this machine both in construction and operation, its durability and unfailing accuracy make it a truly labor saving machine—and it is manageable by a lad.

Operation: A rail, being tenented and reduced to the length required is laid in the rests E E and the headstocks C C being advanced by the lever L through the medium of the connecting rods J and the sliding carriage which carries the cutter heads till they touch the shoulders of the rail are made fast to the bench by means of the screw bolts D D, after which no further adjustment is required for rails of the same length, as every rail of the same pattern exactly fits the rests, by which arrangement the screws are made precisely to agree relatively to the shoulders and irrespective of the length of the tenents which may be unequal in length, which is not the case in any other machine, for the same purpose, known to the inventors. The various pivot holes in the rods J J make the machine adjustable to various lengths of rails. The rail being laid in the rests, and the carriages F F being in the position as shown in view, Fig. —2— are made to approach each other by means of the lever L until the V cutters touch the rail, a revolving motion being then imparted to the rail by the means of a winch M which is secured to the rail, the cutters and the followers behind them, at the same time, traverse the rail in the direction of the thread, being drawn forward by the revolving motion of the rail and the oblique position of the V cutters and threads of the semicircular screw.

What we claim as our invention and desire to secure by Letters Patent is—

The combination of the simultaneous adjuster and graduator L, J J with the headstocks C C the semicircular female governors G G and V or other formed bits or cutters substantially as above described, through the medium of which, a perfect simultaneous movement of the bits is produced in adjusting their relative distances as regards the shoulders of the rail and in cutting the screws, and also a simultaneous and equal adjustment of the head stocks.

WM. F. CONVERSE.
JONATHAN BURDGE.

Attest:
 HENRY MINER,
 JOHN P. ROSS.